(12) United States Patent
Muchel

(10) Patent No.: US 7,289,271 B2
(45) Date of Patent: Oct. 30, 2007

(54) TUBE LENS UNIT WITH CHROMATICALLY COMPENSATING EFFECT

(75) Inventor: Franz Muchel, Koenigsbronn (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 11/510,962

(22) Filed: Aug. 28, 2006

(65) Prior Publication Data

US 2006/0285219 A1    Dec. 21, 2006

Related U.S. Application Data

(63) Continuation-in-part of application No. PCT/EP2005/001798, filed on Feb. 22, 2005.

(30) Foreign Application Priority Data

Feb. 28, 2004  (DE) ................. 10 2004 009 848

(51) Int. Cl.
G02B 21/02 (2006.01)
G02B 21/00 (2006.01)

(52) U.S. Cl. .................... 359/661; 359/368

(58) Field of Classification Search ........ 359/368, 359/381, 656, 657, 658, 659, 660, 661
See application file for complete search history.

(56) References Cited

U.S. PATENT DOCUMENTS 3,583,789 A   6/1971  Rosenberger
4,365,871 A  12/1982  Muchel
5,161,052 A * 11/1992 Hill ............................ 359/377
6,366,398 B1  4/2002  Ouchi
2002/0154398 A1 10/2002 Wolleschensky et al.

FOREIGN PATENT DOCUMENTS

| DE | 976 880 | 2/1956 |
| DE | 2 047 673 | 5/1971 |
| DE | 257 504 A1 | 6/1988 |
| EP | 1 253 457 A1 | 10/2002 |
| GB | 782213 | 9/1957 |

* cited by examiner

*Primary Examiner*—David N. Spector
(74) *Attorney, Agent, or Firm*—Patterson, Thuente, Skaar & Christensen, P.A.

(57) ABSTRACT

The invention relates to a tube lens unit that obtains a chromatically compensating effect when used with objectives having an infinite image distance and chromatic residual errors. The inventive tube lens unit fulfils the following conditions:

$$CHL = CHL_o - A_T^2 m_T \phi_T = 0 \qquad \text{Equation (1)}$$

$$CHV = CHV_o - 1000\lambda m_T \phi_T d_1 = 0 \qquad \text{Equation (2)}$$

where CHL is the longitudinal chromatic aberration of the combination of tube lens unit plus objective, $CHL_o$ is the longitudinal chromatic aberration of the objective, CHV is the chromatic difference of magnification of the combination of tube lens unit plus objective, $CHV_o$ is the chromatic difference of magnification of the objective.

6 Claims, 3 Drawing Sheets

TUBE LENS UNIT WITH CHROMATICALLY COMPENSATING EFFECT

CROSS REFERENCE TO RELATED PATENT APPLICATIONS

This application is a continuation-in-part of copending international patent application PCT/EP2005/001798 entitled "Tubular Lens Unit Having a Chromatically Compensating Effect" filed Feb. 22, 2005, which claims priority to German Patent Application No. 10 2004 009 848.4, filed Feb. 28, 2004. The entire disclosures of the prior applications are considered as being part of the disclosure of this application and are hereby incorporated by reference herein.

FIELD OF THE INVENTION

The invention relates to a tube lens unit that provides a chromatically compensating effect when used with objectives having an infinite image distance and chromatic residual errors. The tube lens unit is particularly suitable for generating a color-free primary (intermediate) image in the imaging ray paths of microscopes.

BACKGROUND OF THE INVENTION

In prior art, so-called ICS systems ("infinity color-corrected systems") are known, which consist essentially of an objective having chromatic residual errors and an infinite image distance, and a tube lens unit having a chromatically compensating effect. Thanks to such a combination, the intermediate image, despite the chromatic residual errors of the objective, is formed without chromatic aberrations, so that a very largely true-to-color rendition of microscopic specimen details is obtained throughout the image field.

A considerable disadvantage of the ICS systems known so far is the fact that the distance between the objective and the tube lens unit is variable within close limits only, so that these ICS systems are tied to given tube focal length and thus can only be use with instruments for which they have been conceived.

Frequently, however, it is desirable for the user, for cost reasons, to have a tube lens unit that can be used alternatingly with several optical instruments, each of which was originally conceived for a separate, fixed focal length.

SUMMARY OF THE INVENTION

The invention is therefore based on the problem to create a tube lens unit of the kind mentioned in the beginning, which can be employed with several optical instruments of different tube focal lengths, while always having the same chromatically compensating effect.

This problem is solved by means of a tube lens unit that fulfils the following conditions:

$$CHL = CHL_o - A_T^2 m_T \phi_T = 0 \qquad \text{Equation (1)}$$

$$CHV = CHV_o - 1000\lambda m_T \phi_T d_1 = 0 \qquad \text{Equation (2)}$$

where

CHL is the longitudinal chromatic aberration of the tube lens unit, $CHL_o$ is the longitudinal chromatic aberration of the objective, CHV is the chromatic difference of magnification of the tube lens unit, $CHV_o$ is the chromatic difference of magnification of the objective, $\lambda$ is the wavelength, $m_T$ is the dispersion index of the tube lens unit, derived from $m_T = m_e = 1/\lambda v$, in which e is the index of the main color and $v$ the Abbe number, $A_T$ is the radius of the exit pupil of the objective=entrance pupil of the tube lens unit, $A_T^2 m_T \phi_T = CHL_T$ (longitudinal chromatic aberration of the tube lens unit), $1000\lambda m_T \phi_T d_1 = CHV_T$ (chromatic difference of magnification of the tube lens unit), $d_1$ is the distance of the first optical element of the tube lens unit from the entrance pupil, $\phi_T$ is the refractive power, and T is the index of the respective lens in the tube lens unit.

For both equations, the product of the values of $m_T$ and $\phi_T$ should have the same amount.

The CHL is given in terms of Rayleigh units RU, and the CHV in terms of ‰. By normalization to Rayleigh units (1 RU=$\lambda$/n sin u), the CHL to be compensated has an aperture-adapted value for objectives and, consequently, also for tube lens units of any focal length. The CHV given in terms of ‰ must have a constant value for tube lens units of any focal length. (Literature: H. G. Zimmer, Geometrische Optik, Springer Verlag Berlin, Heidelberg, New York.)

The tube lens units must have at least one lens as a compensating optical element. In developments of the invention, however, two or more lenses may be provided as compensating optical elements.

If two lenses are provided, both may be configured as biconvex lenses. Alternatively, one biconvex lens and one cemented component may be provided, the cemented component preferably comprising one biconcave and one plano-convex lens. The plane surface should be arranged facing the eyepiece. In further development versions of the tube lens unit according to the invention, the use of several cemented components is feasible as well.

In embodiments of the optical tube lens unit according to the invention, two cases must be distinguished in principle.

In a first case A, the conditions given by equations (1) and (2) are fulfilled by means of two optical elements, each of which may be a single lens or a cemented component.

The compensating effect is obtained for different magnifications, by the combination of any ICS objectives with the tube lens unit according to the invention, provided the optical elements of the latter have focal lengths of, e.g., 1.3 f, 1 f, 0.8 f, . . . 0.25 f.

Let $K_1 = -A_T^2$, $K_2 = 1000\lambda d_1$, where $K_{11}$ and $K_{12}$ are coefficients of the first optical element and $K_{21}$ and $K_{22}$ coefficients of the second optical element; the necessary individual focal lengths of the two elements are derived from the ray coordinates of the aperture and field rays after ray tracing with the various focal lengths of the tube lens unit.

The dispersion indices $m_1$ and $m_2$ of the optical elements are determined by $$K_{11}\phi_1 m_1 + K_{12}\phi_2 m_2 = -CHL_o, \text{ and} \qquad \text{Equation (3)}$$

$$K_{21}\phi_1 m_1 + K_{22}\phi_2 m_2 = -CHV_o, \qquad \text{Equation (4)}$$

the values of $K_{11}$, $K_{12}$, $K_{21}$ and $K_{22}$ being determined from ray tracing with $\phi_i$.

In a second case B, the conditions given by equations (1) and (2) are fulfilled by means of a single lens. Here, the required quantities can be derived from equations (3) and (4), if we set $\phi_1=\phi_T$ and $\phi_2=0$. This makes $K_{11}=-A_T^2$, and $K_2=1000\lambda\, d_1$.

Because of the limits for the dispersion indices $m_T$, which are between 20 and 90, tube lens units using only a single compensating lens are only possible with limited focal lengths, too. For focal lengths exceeding the limit, a cemented component has to be used also in case B.

For this, the following conditions apply:

$$K_1 m_T \phi_T = -CHL,\text{ and} \qquad \text{Equation (5)}$$

$$K_2 m_T \phi_T = -CHV, \qquad \text{Equation (6)}$$

with $m_T=-CHL/K_1 \phi_T$. The value of CHV ($=K_2/K_1 \cdot CHL$) also results therefrom.

The special case B has already been implemented in connection with tube lenses having a focal length of f=160 mm.

The solution according to the invention has made it basically possible to use also such optical elements (lenses) in the tube lens unit whose focal length f considerably deviates from the value of f=160 mm as common so far.

It has further been discovered that known technical glass, e.g., SF6, can be used for compensating optical elements in the tube lens having a focal length of 350 mm. In this way it is possible to achieve that all ICS objectives having chromatic residual errors of $CHL_o$=+5.7 [RU] and $CHV_o$=+14.2[‰] can be used for an ICS optical system.

DESCRIPTION OF THE FIGURES

Below, the invention is explained in more detail, going by two exemplary embodiments, wherein.

DETAILED DESCRIPTION OF PREFERRED EMBODIMENTS

Figure 1:
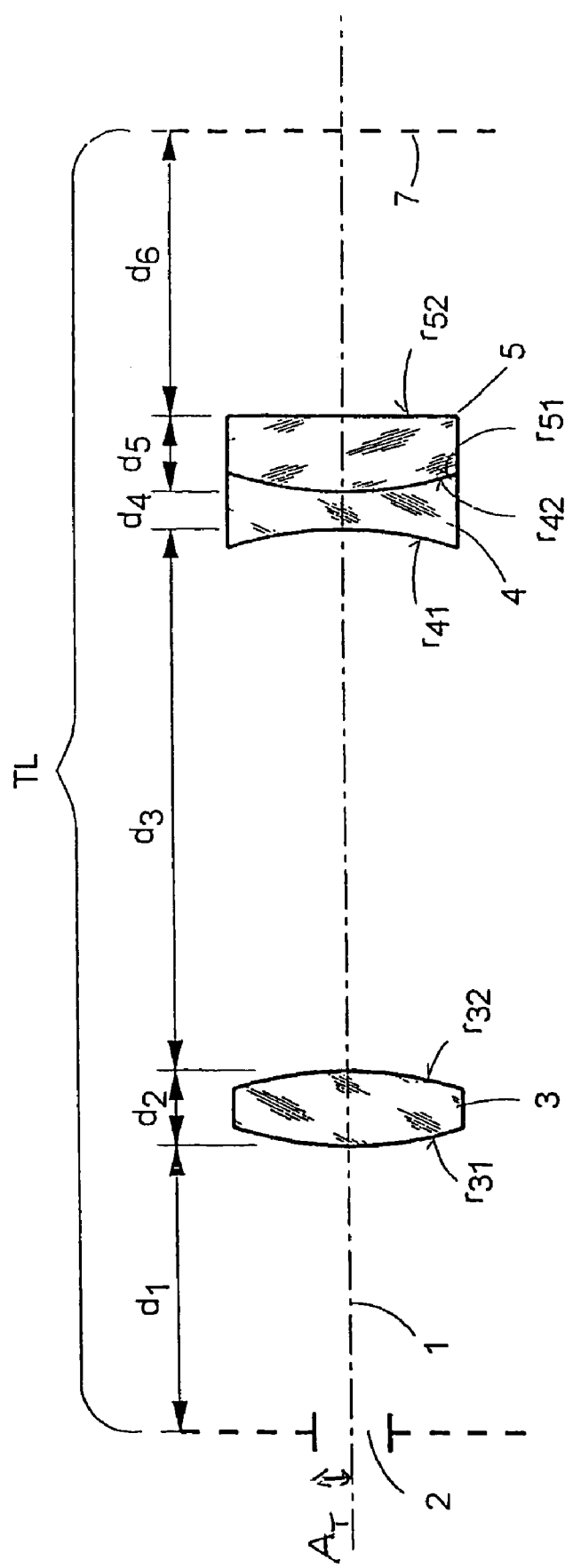
FIG. 1 shows a tube lens unit according to case A featuring a single lens and a cemented component consisting of a biconcave and a planoconvex lens.

FIG. 1 shows the principle of the embodiment of a tube lens unit TL according to case A. Beginning on the left-hand margin, the drawing contains the following details: the optical axis 1; the position 2 of the entrance pupil of the exit pupil of an objective (not shown by the drawing) which coincides with the entrance pupil of the tube lens unit TL; a first lens 3 arranged at a distance $d_1$=126 mm from position 2, as a compensating optical element having the thickness $d_2$=6 mm and the radii $r_{31}$=62.634 mm and $r_{32}$=−117.15 mm; a cemented component following at a distance $d_3$=25.1 mm as a second compensating optical element, consisting of a biconcave lens 4 having a thickness $d_4$=2 mm and the radii $r_{41}$=−55.033 mm and $r_{42}$=49.048 mm, and a planoconvex lens 5 having the thickness $d_5$=3.5 mm and the radii $r_{51}$=49.048 mm and $r_{52}$=∞. The distance between the planoconvex lens 5 of the cemented component and the intermediate image plane 7 is $d_6$=167 mm.

The entrance pupil of the objective of infinite image distance, the chromatic residual error of which is to be compensated by means of the tube lens unit TL shown, is in position 2.

The glasses intended are N-PK51 for lens 3, N-LAK10 for lens 4, and N-SF5 for lens 5.

Figure 2:
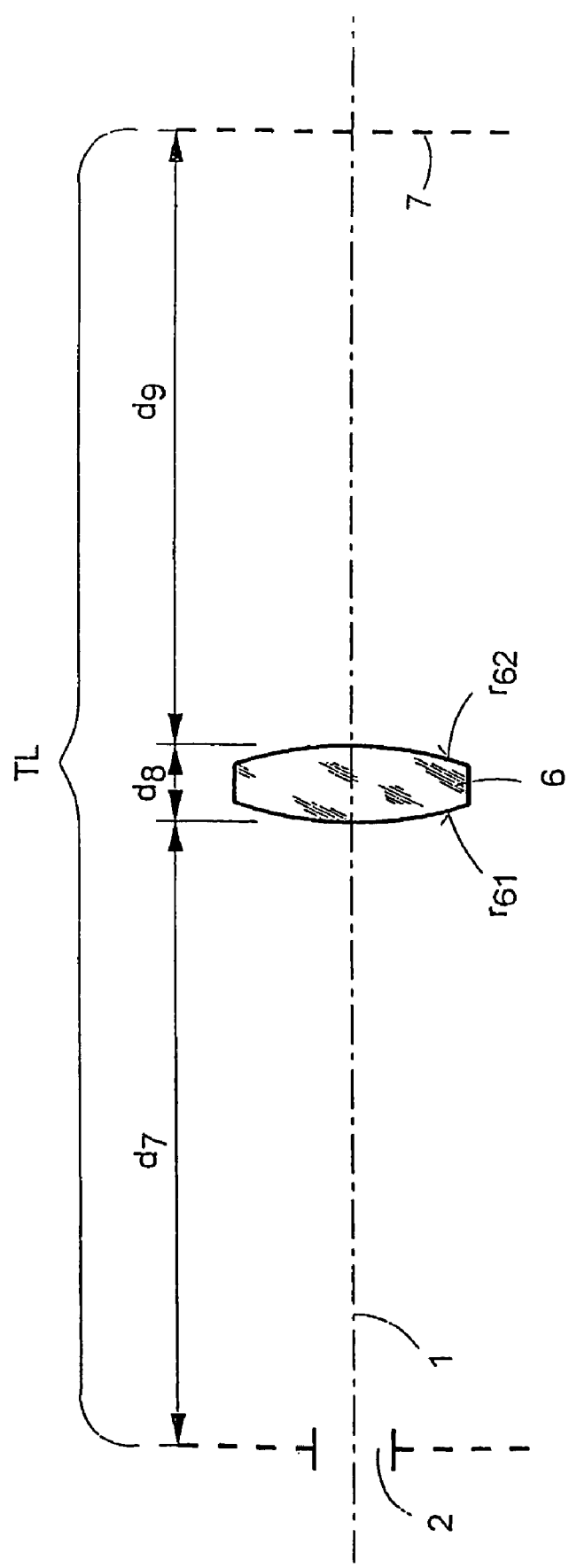
FIG. 2 shows a tube lens unit according to case B featuring a single lens.

FIG. 2 shows an exemplary embodiment of a tube lens unit TL according to the case B described above.

Beginning on the left-hand margin, the drawing contains the following details: the optical axis 1; the position 2 of the exit pupil of an objective (not shown by the drawing); a first lens 6 arranged at a distance $d_7$=126 mm and having a thickness $d_8$=10.9 mm and the radii $r_{61}$=189.417 mm and $r_{62}$=−189.417 mm. The distance between the lens 6 and the intermediate image plane 7 is $d_9$=167 mm. Here again, the objective of infinite image distance, the chromatic residual error of which is to be compensated by means of the tube lens unit TL shown, is not shown by the drawing. The exit pupil of this objective is in position 2.

Lens 6 is made of technical N-BaLF4 glass.

Figure 3:
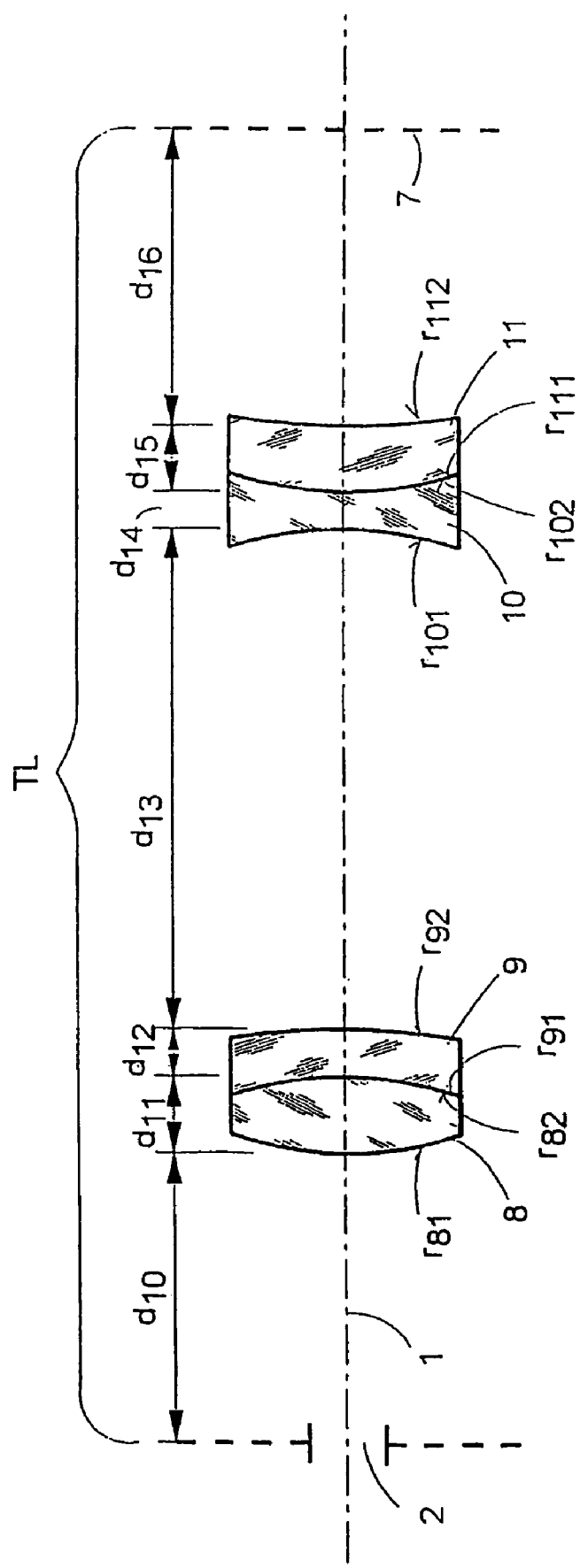
FIG. 3 shows another tube lens unit according to case A, but featuring two cemented components.

FIG. 3 shown another possible embodiment of the tube lens unit TL according to the invention and to case A. Here again, the drawing shows the optical axis 1, the position 2 of the exit pupil of an objective (not shown by the drawing), and the intermediate image plane 7.

Other than in the embodiment shown in FIG. 1, this version is provided with two cemented components as compensating optical elements, with the first cemented components consisting of two lenses 8 and 9, and the other cemented component consisting of two lenses 10 and 11.

Lens 8 is made of N-PSK 53 glass and has a thickness $d_{11}$=4 mm and radii $r_{81}$=23.714 mm and $r_{82}$=−37.584 mm. Lens 9 is made of N-LASF45 glass and has a thickness $d_{12}$=2 mm and radii $r_{91}$=−37.584 mm and $r_{92}$=−375.84 mm.

Lens 10 in the second cemented component consists of technical N-FK5 glass and has a thickness of $d_{14}$=1.5 mm and radii of $r_{101}$=−10.593 mm and $r_{102}$=6.13 mm. The material intended for lens 11 is N-LASF45, its thickness is $d_{15}$=2.5 mm, and its radii are $r_{111}$=6.13 mm and $r_{112}$=8.9125 mm.

The distance between the position 2 of the entrance pupil and the first cemented component is $d_{10}$=126 mm, the distance between the two cemented components is $d_{13}$=25.82 mm, and the distance between the second component and the intermediate image plane 7 is $d_{16}$=167 mm.

The problem of the invention, i.e. the provision of a tube lens unit TL that can be used with a good chromatically compensating effect for several optical instruments having different tube focal lengths, is solved by using suitable focal lengths and glass materials for the elements of the tube lens unit TL, which contains different focal lengths.

LIST OF REFERENCE NUMBERS

1 Optical axis
2 Position of the entrance pupil of an objective
3 Lens
4 Lens
5 Lens
6 Lens
7 Intermediate image plane
8 Lens
9 Lens
10 Lens
11 Lens
TL Tube lens unit
$d_{ij}$ Distances and thicknesses
$r_{ij}$ Radii

What is claimed is:

1. A tube lens unit, containing various focal lengths, with chromatically compensating effect for use with objectives of infinite image distance and chromatic residual errors, wherein the tube lens unit (TL) satisfies the following conditions:

$$CHL = CHL_o - A_T^2 m_T \phi_T = 0 \qquad \text{Equation (1)}$$

$$CHV = CHV_o - 1000\lambda m_T \phi_T d_1 = 0 \qquad \text{Equation (2)}$$

where

CHL is the longitudinal chromatic aberration of the combination of tube lens unit plus objective, $CHL_o$ is the longitudinal chromatic aberration of the objective, CHV is the chromatic difference of magnification of the combination of tube lens unit plus objective, $CHV_o$ is the chromatic difference of magnification of the objective, $\lambda$ is the wavelength, $m_T$ is the dispersion index of the optical elements in the tube lens unit, derived from $m_T = m_e = 1/\lambda v$, in which e is the index of the main color and $v$ the Abbe number, $A_T$ is the radius of the exit pupil of the objective which is substantially equal to the entrance pupil of the lens unit, $d_1$ is the distance of the first optical element of the tube lens unit from the entrance pupil, $\phi_T$ is the refractive power, and T is the index of the respective lens in the tube lens unit, $A_T^2 m_T \phi_T = CHL_T$ is the longitudinal chromatic aberration of the tube lens unit, and $1000\lambda_e\ m_T\ \phi_T\ d_1 = CHV_T$ is the chromatic difference of magnification of the tube lens unit.

2. A tube lens unit as claimed in claim 1, further comprising at least one compensating optical element which, allowing for equations (1) and (2), is determined by $$K_{11}\phi_1 m_1 + K_{12}\phi_2 m_2 = -CHL_o, \text{ and} \qquad \text{Equation (3)}$$

$$K_{21}\phi_1 m_1 + K_{22}\phi_2 m_2 = -CHV_o, \qquad \text{Equation (4)}$$

the values of $K_{11}$, $K_{12}$, $K_{21}$ and $K_{22}$ being coefficients determined from ray tracing with $\phi_i$.

3. A tube lens unit as claimed in claim 2, further comprising one compensating optical element, which is configured as a biconvex lens.

4. A tube lens unit as claimed in claim 2, further comprising two compensating optical elements, a first of which is configured as a biconvex lens and second one as a cemented component.

5. A tube lens unit as claimed in claim 4, wherein the cemented component comprises a biconvex and a planoconvex lens, with the plane surface arranged to face the eyepiece.

6. A tube lens unit as claimed in claim 2, further comprising two compensating optical elements and both configured as cemented components.

* * * * *

UNITED STATES PATENT AND TRADEMARK OFFICE
CERTIFICATE OF CORRECTION

PATENT NO. : 7,289,271 B2  Page 1 of 1
APPLICATION NO. : 11/510962
DATED : October 30, 2007
INVENTOR(S) : Franz Muchel It is certified that error appears in the above-identified patent and that said Letters Patent is hereby corrected as shown below:

Column 1, Line 40, delete "use", insert -- used --

Column 2, Line 52, after "$K_{22}$", insert -- are --

Column 4, Line 15, delete "shown", insert -- shows --

Column 6, Line 17, after "and", insert -- a --

Signed and Sealed this

Fifteenth Day of July, 2008

JON W. DUDAS
*Director of the United States Patent and Trademark Office*